J. W. EVANS.
Churn.
No. 28,462.  Patented May 29, 1860.
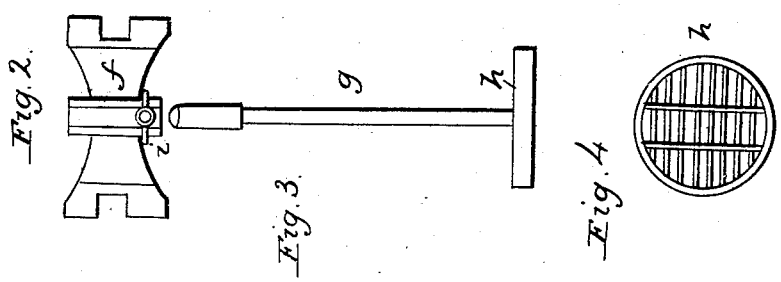
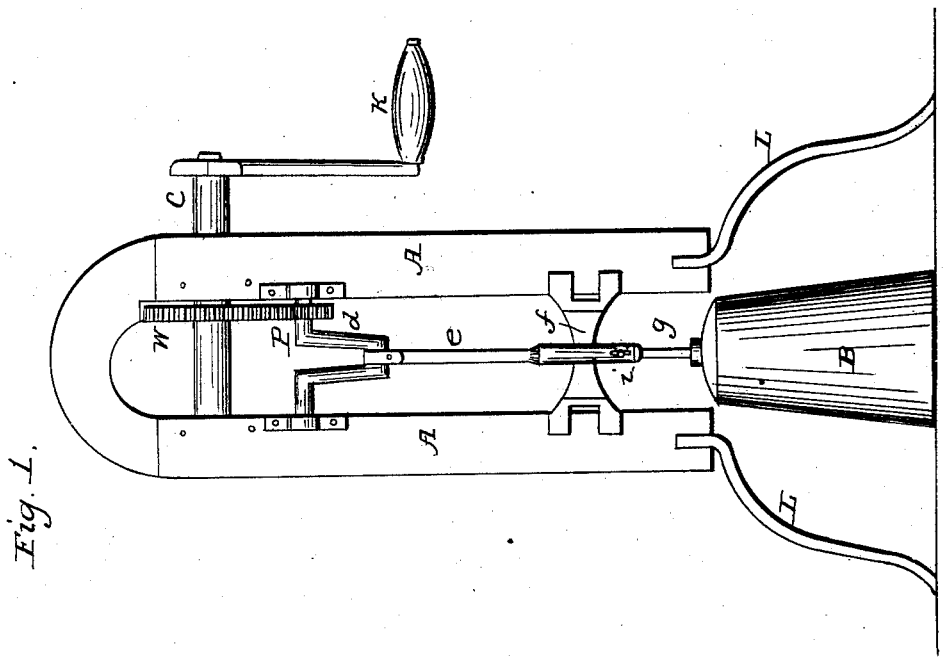

UNITED STATES PATENT OFFICE.

J. W. EVANS, OF FORSYTH, GEORGIA.

CHURN.

Specification of Letters Patent No. 28,462, dated May 29, 1860.

*To all whom it may concern:*

Be it known that I, J. W. EVANS, of Forsyth, county of Monroe, State of Georgia, have made an Improvement in the Mode of Constructing Churns; and I do hereby declare that the following is a full and exact description thereof, reference being had to the accompanying drawings and to the letters of reference marked thereon.

The nature of my invention consists in providing a frame with suitable gearing to communicate a reciprocating motion to which the dasher of an ordinary churn can be attached or detached with facility, the whole forming a churn which can be worked to great advantage by a laborer by means of a crank.

Figure 1 is a perspective of the machine with the churn in place and dasher attached. Fig. 2 is a view of the cross-head or sash which receives the dasher in the bore prepared for the purpose. Fig. 3 is a side view of the dasher and Fig. 4 a view of the bottom of the dasher.

The frame —A— is supported by suitable legs —L— and near the top supports a shaft —c— with a crank —k— and cogged wheel —w— which by means of the pinion —p— operates the crank —d— thus communicating through the pitman rod —e— motion to the sash —f—. The dasher —g— is secured in place by means of the set screw —i—. On turning the crank —k— several strokes of the dasher are made to each revolution of the crank, thus concentrating the labor in agitating the cream placed in the churn, and this agitation is further facilitated by the form of the dasher used which on reference to Fig. 4 will be seen to be what is known as the " grated dasher."

I am aware that churn dashers have before been operated by a crank motion. This I do not claim, neither do I claim the grated dasher, as they are old and well known.

What I claim as my invention and desire to secure by Letters Patent, is—

The combination of the above mechanical arrangement with the grated dasher, sash *f*, and set screw *i;* the whole of the devices arranged as described for the purposes set forth.

J. W. EVANS.

Witnesses:
    J. A. MAGOUAN,
    JEHU AYCOCK.